United States Patent
Zhu et al.

(10) Patent No.: US 11,926,254 B2
(45) Date of Patent: Mar. 12, 2024

(54) OPTICAL ELEMENT, VEHICLE LAMP MODULE, VEHICLE LAMP, AND VEHICLE

(71) Applicant: HASCO VISION TECHNOLOGY CO., LTD., Shanghai (CN)

(72) Inventors: He Zhu, Shanghai (CN); Wenhui Sang, Shanghai (CN); Cong Li, Shanghai (CN); Dapan Zhang, Shanghai (CN); Zhiping Qiu, Shanghai (CN)

(73) Assignee: HASCO VISION TECHNOLOGY CO., LTD., Shanghai (CN)

( * ) Notice: Subject to any disclaimer, the term of this patent is extended or adjusted under 35 U.S.C. 154(b) by 71 days.

(21) Appl. No.: 17/624,039

(22) PCT Filed: Dec. 10, 2020

(86) PCT No.: PCT/CN2020/135363
§ 371 (c)(1),
(2) Date: Dec. 30, 2021

(87) PCT Pub. No.: WO2021/121131
PCT Pub. Date: Jun. 24, 2021

(65) Prior Publication Data
US 2022/0355724 A1 Nov. 10, 2022

(30) Foreign Application Priority Data
Dec. 20, 2019 (CN) .......................... 201922342997.X

(51) Int. Cl.
*B60Q 1/00* (2006.01)
*F21S 41/24* (2018.01)
(Continued)

(52) U.S. Cl.
CPC ............ *B60Q 1/0041* (2013.01); *F21S 41/24* (2018.01); *F21S 41/36* (2018.01); *F21S 43/236* (2018.01);
(Continued)

(58) Field of Classification Search
CPC ..... F21S 41/24; G02B 6/0015; G02B 6/0018; G02B 6/002; G02B 6/0023
See application file for complete search history.

(56) References Cited

U.S. PATENT DOCUMENTS

| 2004/0156209 A1* | 8/2004 | Ishida ................... F21S 41/176 257/E33.059 |
| 2017/0009950 A1 | 1/2017 | Lin et al. |

(Continued)

FOREIGN PATENT DOCUMENTS

| CN | 206592963 U | * 10/2017 | ............ F21S 41/143 |
| CN | 107525005 A | * 12/2017 | .............. F21V 17/10 |

(Continued)

OTHER PUBLICATIONS

Machine translation of WO 2017185118 A1 retrieved from the FIT database of PE2E search. (Year: 2023).*

(Continued)

*Primary Examiner* — Colin J Cattanach
(74) *Attorney, Agent, or Firm* — Volpe Koenig

(57) ABSTRACT

An optical element, comprising a light guide body. The light guide body comprises a plurality of light-incident parts arranged along a length extension direction of the light guide body, a light guide part and a light-emitting part; each light-incident part is provided with at least one light-incident unit; the light guide part is configured to guide light received by each light-incident unit to be emitted toward the light-emitting part; the shape of a forward projection plane of the light-emitting part is of a strip shape. The optical element can reduce the occupied space and improve the space utilization rate, facilitates reducing positioning mounting errors, has an appearance with a narrow and elongated shape, and can be applied in vehicle lamp modules, vehicle lamps and vehicles.

17 Claims, 15 Drawing Sheets

(51) Int. Cl.
  *F21S 41/32* (2018.01)
  *F21S 41/36* (2018.01)
  *F21S 43/236* (2018.01)
  *F21S 45/47* (2018.01)
  *F21V 8/00* (2006.01)
  *F21W 102/135* (2018.01)

(52) U.S. Cl.
  CPC .......... *G02B 6/0016* (2013.01); *B60Q 1/0011* (2013.01); *F21S 41/322* (2018.01); *F21S 45/47* (2018.01); *F21W 2102/135* (2018.01)

(56) References Cited

U.S. PATENT DOCUMENTS

| | | | |
|---|---|---|---|
| 2018/0087745 A1 | 3/2018 | Gromfeld | |
| 2021/0301995 A1* | 9/2021 | Nishimura | ............ F21S 41/265 |

FOREIGN PATENT DOCUMENTS

| | | | |
|---|---|---|---|
| CN | 207975591 U | 10/2018 | |
| CN | 108954212 A | 12/2018 | |
| CN | 109611780 A | 4/2019 | |
| CN | 209309892 U | 8/2019 | |
| CN | 110220158 A | 9/2019 | |
| CN | 110486688 A | 11/2019 | |
| CN | 211694709 U | 10/2020 | |
| JP | 2018032512 A | 3/2018 | |
| WO | 2017120630 A1 | 7/2017 | |
| WO | WO-2017185118 A1 * | 11/2017 | ............ F21S 41/143 |

OTHER PUBLICATIONS

Machine translation of CN 107525005 A retrieved from the FIT database of PE2E search. (Year: 2023).*

Machine translation of CN 206592963 U retrieved from the FIT database of PE2E search. (Year: 2023).*

National Standard of the People's Republic of China "Motor vehicle headlamps equipped with filament lamps" Nov. 1, 2007. English translation attached.

* cited by examiner

OPTICAL ELEMENT, VEHICLE LAMP MODULE, VEHICLE LAMP, AND VEHICLE

CROSS REFERENCE TO RELATED APPLICATIONS

The present application is a 35 U.S.C. § 371 national stage of PCT/CN2020/135363, which is entitled "OPTICAL ELEMENT, VEHICLE LAMP MODULE, VEHICLE LAMP, AND VEHICLE" and claims the benefits of Chinese patent application 201922342997.X, filed on Dec. 20, 2019, both of which are incorporated herein by reference as if fully set forth.

TECHNICAL FIELD

The present disclosure relates to a vehicle lighting technology, and specifically relates to an optical element. In addition, the present disclosure also relates to a vehicle lamp module, a vehicle lamp and a vehicle.

BACKGROUND

With the rapid development of the vehicle industry and the continuous improvement of people's living conditions, vehicles have become one of the indispensable means of transportation for people to travel. The vehicle holdings are increasing year by year, and the popularity of vehicles has brought development to the manufacture and design of auto parts. For example, people have higher and higher requirements on vehicle lamps, and the role of the vehicle lamps is no longer limited to functional lighting, and consumers begin to pursue the appearance effect.

At present, the modelings of vehicle lamps are becoming more and more diverse, leading to more and more diversified types of vehicle lighting devices. An vehicle lighting device includes a plurality of dispersed vehicle lighting units, and the vehicle lamping units are dispersed and independent of each other. There are corresponding light-incident parts and light-emitting parts, which can generate a plurality of lighting regions.

However, the plurality of vehicle lighting units are arranged dispersedly and independently. On the one hand, the entire vehicle lighting device occupies a large space, which increases the size of vehicle lamps. On the other hand, a plurality of dispersed light-emitting surfaces cannot satisfy the demand of a customer for the appearance of light-emitting surfaces of vehicle lamps. On the third aspect, the positioning and installation errors between the plurality of vehicle lighting units and between components of each vehicle lighting unit are relatively large, which affects the optical system accuracy.

Therefore, it is necessary to design a new optical element to overcome or alleviate the above-mentioned shortcomings of the prior art.

SUMMARY

The technical problem to be solved in the first aspect of the present disclosure is to provide an optical element. The optical element can reduce the occupation space and increase the space utilization rate, is favorable for reducing the positioning and installation error, and has a narrow-long appearance modeling.

The technical problem to be solved in the second aspect of the present disclosure is to provide a vehicle lamp module. The vehicle lamp module has relatively high optical system accuracy, is better in lighting effect, and has a narrow-long appearance modeling.

The technical problem to be solved in the third aspect of the present disclosure is to provide a vehicle lamp. The vehicle lamp module is better in lighting effect, and has a narrow-long appearance modeling.

The technical problem to be solved in the fourth aspect of the present disclosure is to provide a vehicle. The vehicle is relatively good in space utilization rate and convenient for structural design.

In order to achieve the above-mentioned objective, the first aspect of the present disclosure provides an optical element, including a light guide body; the light guide body includes a plurality of light-incident parts arranged along a length extension direction of the light guide body, a light guide part and a light-emitting part; each light-incident part is provided with at least one light-incident unit, the light guide part is configured to guide light received by each light-incident unit to be emitted towards the light-emitting part; and the shape of a forward projection plane of the light-emitting part is of a strip shape.

Preferably, at least one groove structure is formed on the light guide part.

More preferably, one groove structure is formed in a middle region or one of two side regions of the light guide part.

Further, a cut-off part used for forming a light shape cut-off line is formed on one of the groove structures.

Preferably, the groove structures are respectively formed in the two side regions of the light guide part.

Further, a plurality of groove structures that are in one-to-one correspondence to the light-incident parts are formed on the light guide part.

Preferably, the light guide part is divided into a plurality of light guide structures that are in one-to-one correspondence to the light-incident parts, and gaps are formed between adjacent side walls of adjacent light guide structures.

Optionally, the width of the front projection surface of the light-emitting part is not less than 5 mm and not greater than 30 mm.

More preferably, the light guide body further includes a reflection surface, and the reflection surface is configured to reflect the light received by the light-incident units to the light guide part.

Specifically, the light-incident unit is a light concentrating structure in a light concentrating cup shape.

Specifically, each light-incident part is provided with a plurality of light-incident units that are connected, and the light-incident unit is a protrusion which protrudes towards a light-incident side.

Preferably, the light-emitting part is a smooth curved surface, and the arrangement direction of the light-incident parts is consistent with the length extending direction of the light-emitting part.

Preferably, the light-emitting part is formed by connecting a plurality of convex curved surfaces in sequence.

The second aspect of the present disclosure provides an vehicle lamp module, including the optical element according to any one of the technical solutions of the first aspect, and a plurality of separately addressable light sources corresponding to the light-incident units.

Typically, a circuit board and a heat dissipater are also included; the light sources are located on the circuit board connected to the heat dissipater; and a connecting structure connected to the circuit board is arranged on the light guide body.

The third aspect of the present disclosure provides an vehicle lamp, including the vehicle lamp module according to any one of the technical solutions of the second aspect.

The fourth aspect of the present disclosure provides an vehicle, including the vehicle lamp according to the technical solution of the third aspect.

By means of the above-mentioned technical solutions, the present disclosure has the beneficial effects:

In the basic technical solutions of the present disclosure, the front projection surface of the light-emitting part of the light guide body is in the strip shape. Compared with the prior art that the vehicle lighting units are dispersedly arranged, the present disclosure can achieve a narrow-long appearance modeling effect and improve the positioning and installation accuracy, with a better lighting effect; and moreover, the occupied space is relatively small, and a good space utilization rate can be realized.

Furthermore, the groove structure is formed on the light guide part, and two refraction surfaces are added due to the groove structure, so that the light can pass through the two refraction surfaces sequentially during the propagation in the light guide part. According to the design requirements, tilt angles of the sidewalls of the groove structure can be set to increase the light distribution parameter and make the light distribution more flexible.

Other features and more outstanding advantages of the present disclosure will be described in detail in the following specific implementation modes.

DESCRIPTIONS OF NUMERALS IN THE DRAWINGS

Figure 1:
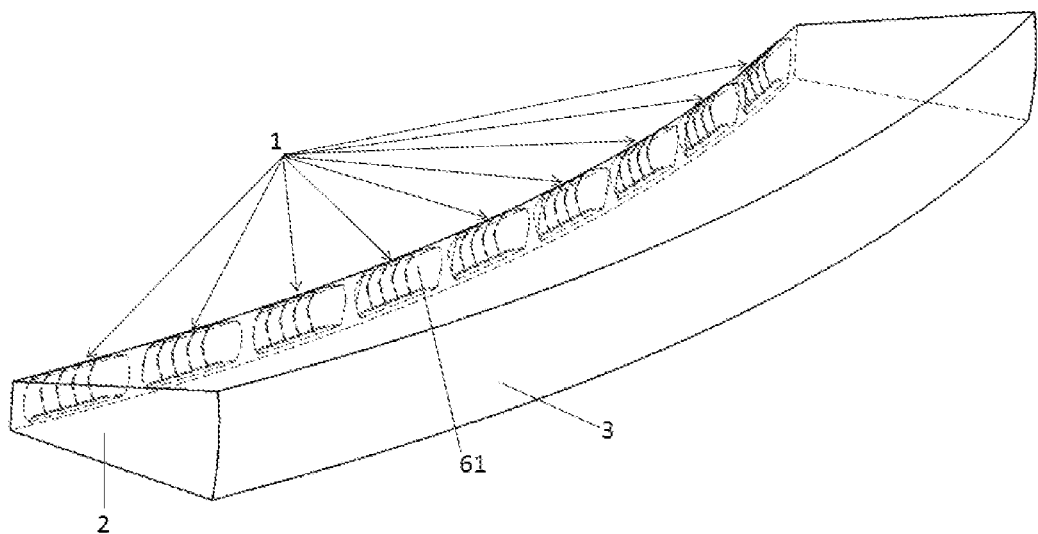
FIG. 1 is a structural schematic diagram I of an optical element in a first implementation mode of the present disclosure.
Figure 2:
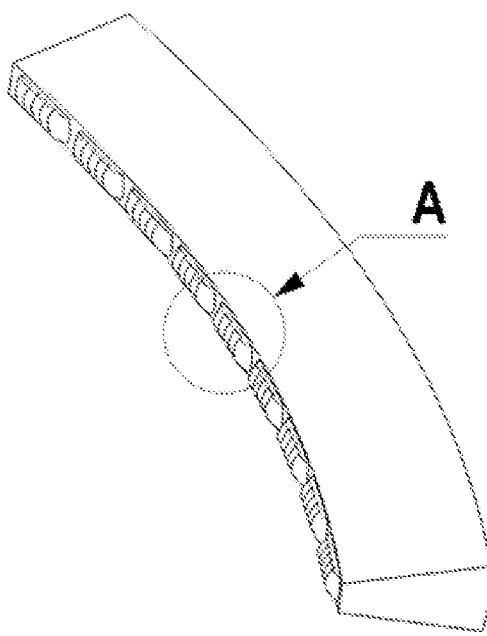
FIG. 2 is a structural schematic diagram II of the optical element in the first implementation mode of the present disclosure.

1: light-incident part
2: light guide part
21: light guide structure
22: gap
3: light-emitting part
4: groove structure
41: cut-off part
5: reflection surface
61: protrusion
62: light concentrating structure
7: circuit board
8: heat dissipater
9: connecting structure
a: main low beam lighting region
b: first auxiliary low beam lighting region c: second auxiliary low beam lighting region

DETAILED DESCRIPTION OF THE EMBODIMENTS

Specific implementation modes of the present disclosure will be described in detail below with reference to the accompanying drawings. It should be understood that the specific implementation modes described herein are only used to illustrate and explain the present disclosure, and are not intended to limit the present disclosure.

In addition, the terms "first" and "second" are only used for descriptive purposes, and cannot be understood as indicating or implying relative importance or implicitly indicating the number of technical features indicated. Therefore, the features limited to "first" and "second" may explicitly or implicitly include one or more of the features.

In the description of the present disclosure, it should be noted that the terms "installed", "arranged" and "connected" should be understood in a broad sense unless otherwise specified and limited. For example, it may be fixed connection, detachable connection, or integrated connection, or may be direct connection or indirect connection through an intermediate medium, or may be internal communication of two elements or interaction between two elements. For those of ordinary skill in the art, the specific meanings of the above terms in the present disclosure can be understood according to specific situations.

It should be understood that, in order to facilitate and simplify the description of the present disclosure, the terms "front", "rear" refer to the front and rear directions of the optical element in the light-emitting direction, that is, the light-emitting part 3 is located at the front, and the light-incident part 1 is located at the rear; the terms "left", "right" refer to the left and right directions of the vehicle during use, and the terms "up", "down" refer to the up and down directions of the vehicle during use; the terms are based on the orientation or positional relationship shown in the drawings, rather than indicating or implying that the device or element referred to must have a specific orientation and be constructed and operated in a specific orientation, and therefore cannot be understood as a limitation to the present disclosure; moreover, when installed in an vehicle, the optical element can be installed in a horizontal direction, a vertical direction, etc. Orientation terms of the optical element of the present disclosure should be understood in conjunction with the actual mounting state.

As shown in FIGS. 1 to 7, FIG. 26, and FIGS. 29 to 35, an optical element of the basic implementation mode of the present disclosure includes a light guide body; the light guide body includes a plurality of light-incident parts 1 arranged along a length extension direction of the light guide body, a light guide part 2 and a light-emitting part 3; each light-incidence part 1 is provided with at least one light-incident unit; the light guide part 2 is configured to guide light received by each light-incident unit to be emitted towards the light-emitting part 3; and the shape of a forward projection plane of the light-emitting part 3 is of a strip shape.

The strip shape is a narrow-long rectangle, which is extremely narrow in a width direction, and has a width range of 5 to 30 mm, preferably, 5 mm, 10 mm, 15 mm, 20 mm, 25 mm, and 30 mm; and the length may be set according to an actual requirement for the modeling of a light-emitting surface to show a narrow-long appearance effect.

In the above-mentioned basic implementation mode, compared with the prior art that vehicle lighting units are dispersedly arranged, the present disclosure is integrated into an integrated light guide body, thus simplifying the structural design, also reducing the positioning and installation error between the vehicle lighting unit as well as between parts, and improving the installation accuracy. The light is incident from the light-incident units, passes through the light guide part 2, and then exits from the light-emitting part 3, which can have a better lighting effect. Moreover, the shape of the front projection surface of the light-emitting part 3 is set as the strip shape, so that the light guide body can be placed in a left-right direction, in an up-down direction or slantways according to a space in a lamp body of an vehicle lamp, thus making full use of the space and occupying a relatively small space; and at the same time, a unique narrow-long appearance effect can be also presented.

Figure 3:
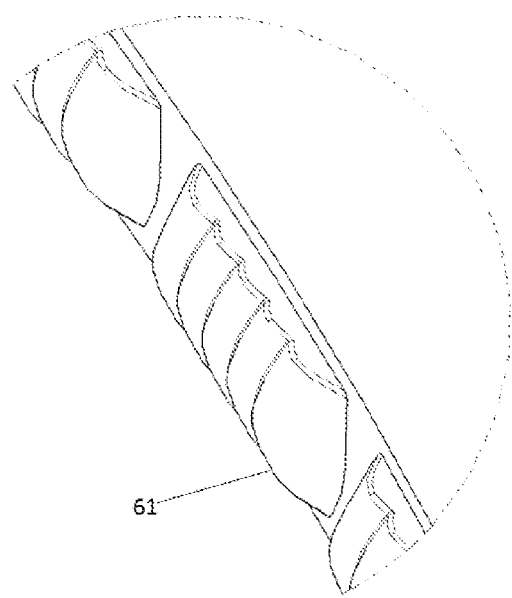
FIG. 3 is a partially enlarged view of a portion A in FIG. 2.
Figure 4:
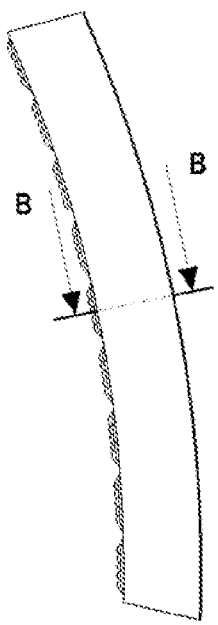
FIG. 4 is a structural schematic diagram III of the optical element in the first implementation mode of the present disclosure.
Figure 5:
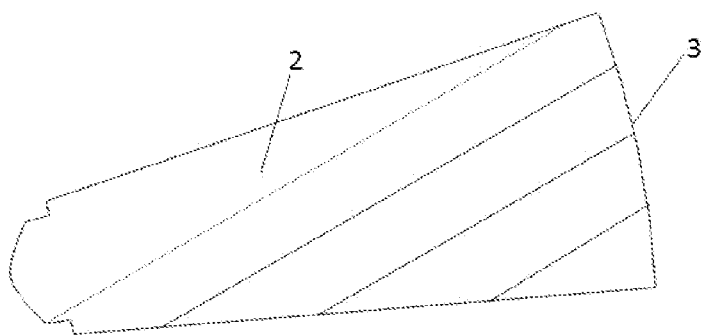
FIG. 5 is a cutaway view of FIG. 4 along the B-B line.
Figure 6:
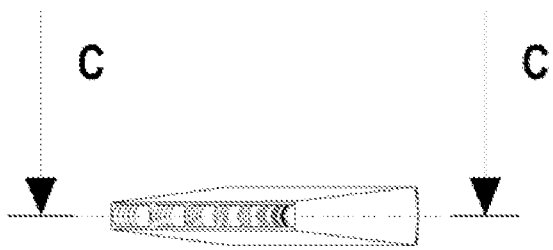
FIG. 6 is a structural schematic diagram IV of the optical element in the first implementation mode of the present disclosure.
Figure 7:
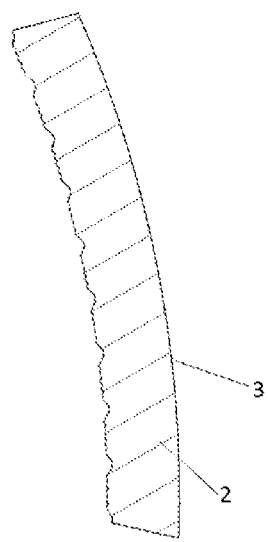
FIG. 7 is a cutaway view of FIG. 6 along the C-C line.
Figure 8:
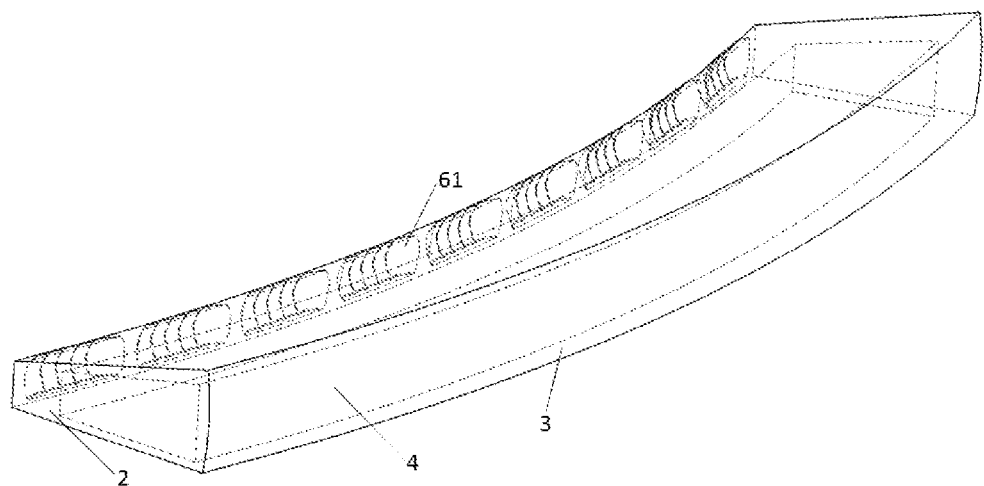
FIG. 8 is a structural schematic diagram I of an optical element in a second implementation mode of the present disclosure.
Figure 9:
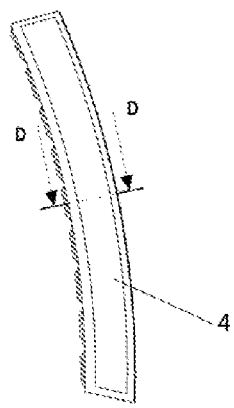
FIG. 9 is a structural schematic diagram II of the optical element in the second implementation mode of the present disclosure.
Figure 26:
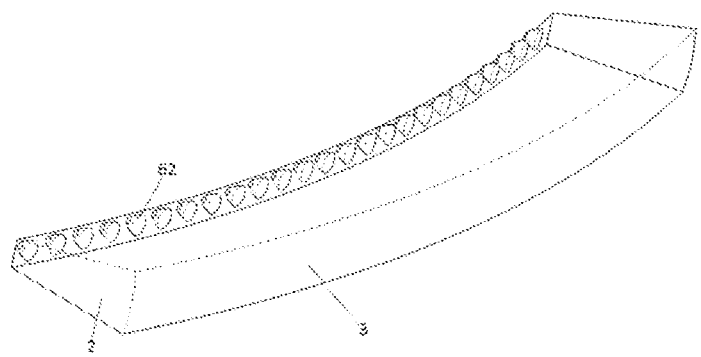
FIG. 26 is a structural schematic diagram of an optical element in a ninth implementation mode of the present disclosure.
Figure 33:
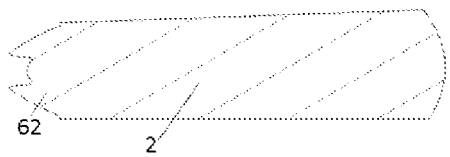
FIG. 33 is a cutaway view of FIG. 32 along the line.
Figure 34:
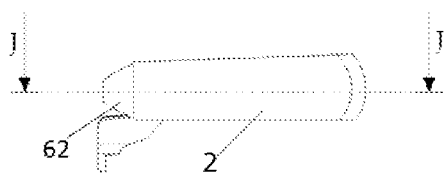
FIG. 34 is a structural schematic diagram V of the optical element in the eleventh implementation mode of the present disclosure.
Figure 35:
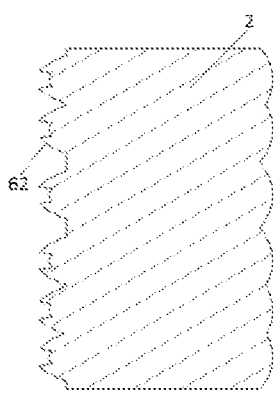
FIG. 35 is a cutaway view of FIG. 34 along the J-J line.

As shown in FIG. 1, the light-emitting part 3 may be a smooth curved surface protruding towards a light-emitting side; the smooth curved surface can make the appearance of the vehicle lamp more attractive; or, as shown in FIG. 29 to FIG. 41, the light-emitting part 3 may also be formed by connecting a plurality of convex curved surfaces in sequence to present different vehicle lamp appearance modelings; the arrangement direction of the light-incident parts 1 is consistent with the length extending direction of the light-emitting part 3; moreover, each light-incident unit may have various structural forms. For example, the light-incident unit may be a protrusion 61 protruding towards a light-incident side. The plurality of light-incident units as shown in FIG. 3 are connected in sequence and disposed on the corresponding light-incident part 1; or, as shown in FIG. 26 or FIG. 33, each light-incident unit may also be an entity light concentrating structure 62 having a light concentrating cup-shaped external contour; a concave cavity is preferably formed in the rear end of the entity light concentrating structure 62 to improve the light efficiency; or, the light-incident unit is other optical structures having equivalent functions.

Figure 10:
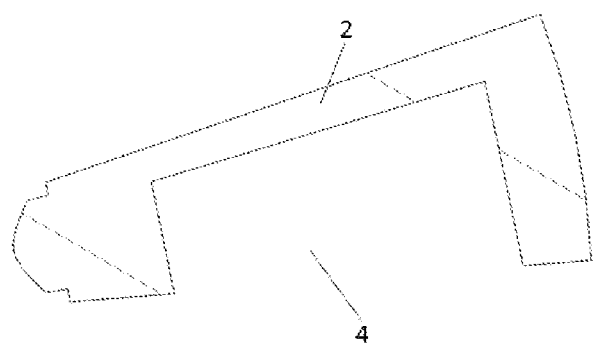
FIG. 10 is a cutaway view of FIG. 9 along the D-D line.
Figure 11:
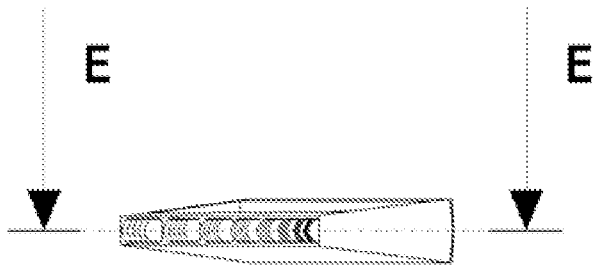
FIG. 11 is a structural schematic diagram III of the optical element in the second implementation mode of the present disclosure.
Figure 12:
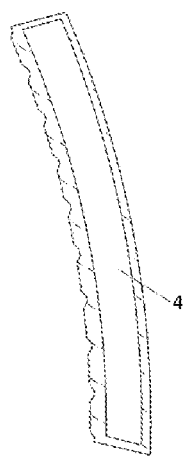
FIG. 12 is a cutaway view of FIG. 11 along the E-E line.

FIG. 1 illustrates a specific implementation mode of the optical element of the present disclosure. Further, in another specific implementation mode of the optical element of the present disclosure as shown in FIG. 8 to FIG. 12, a groove structure 4 may be formed on the light guide part 2, and is disposed in the length extending direction of the light-emitting part 3, in such a way, two refraction surfaces are added on a light propagation path, that is, the light that enters the light guide body needs to be refracted by the two refraction surfaces in sequence and then is emitted from the light-emitting part 3 of the light guide body. For the groove structure 4, FIG. 10 illustrates a positional relationship that a side wall of the groove structure 4 is perpendicular to the bottom of the groove structure 4. Of course, the side wall of the groove structure 4 may also be not perpendicular to the bottom of the groove structure 4. As such, the number of light distribution modes is increased since two refraction surfaces are added, that is, light distribution parameters are increased, and the light distribution is more flexible. The groove structure 4 may be arranged in a middle region of the light guide part 2, or may be arranged in one of two side regions of the light guide part 2, or in other regions. The groove structure 4 may correspond to one light-incident part 1 or multiple light-incident parts 1.

Figure 16:
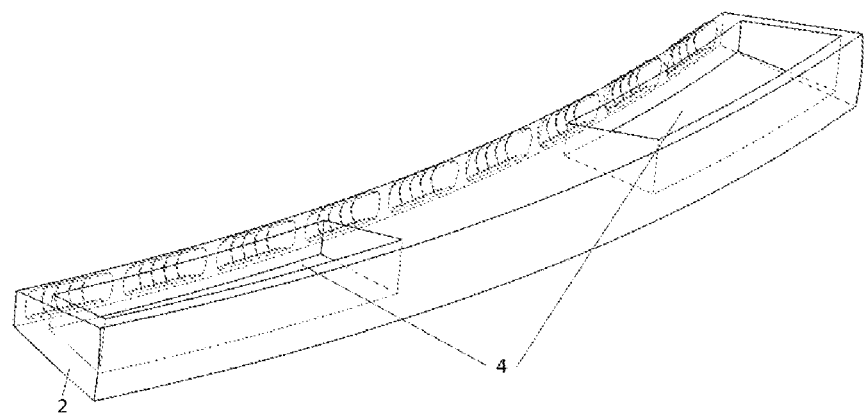
FIG. 16 is a structural schematic diagram of an optical element in a fifth implementation mode of the present disclosure.
Figure 20:
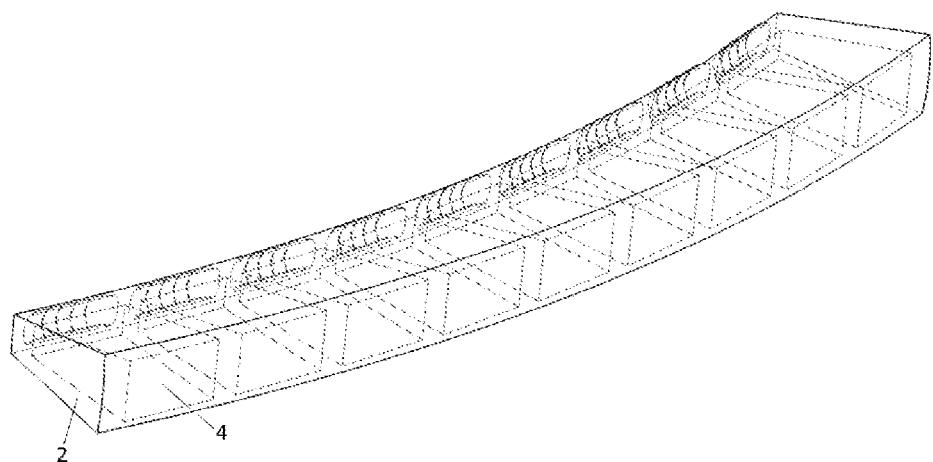
FIG. 20 is a structural schematic diagram I of an optical element in a seventh implementation mode of the present disclosure.
Figure 21:
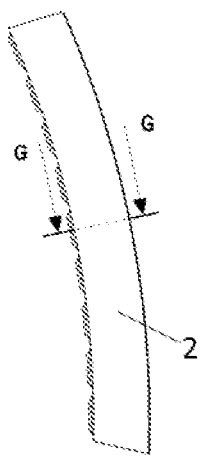
FIG. 21 is a structural schematic diagram II of the optical element in the seventh implementation mode of the present disclosure.
Figure 22:
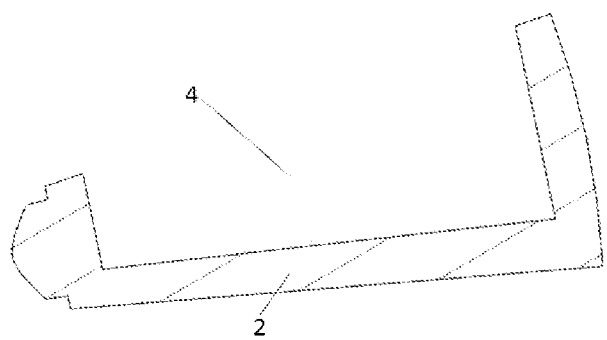
FIG. 22 is a cutaway view of FIG. 21 along the G-G line.
Figure 23:
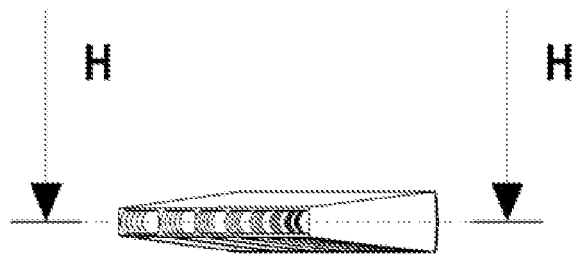
FIG. 23 is a structural schematic diagram III of the optical element in the seventh implementation mode of the present disclosure.
Figure 24:
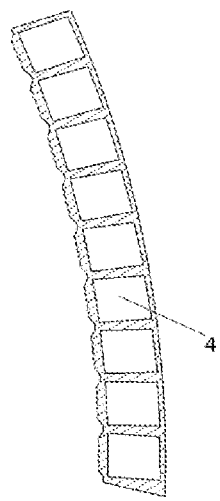
FIG. 24 is a cutaway view of FIG. 23 along the H-H line.
Figure 25:
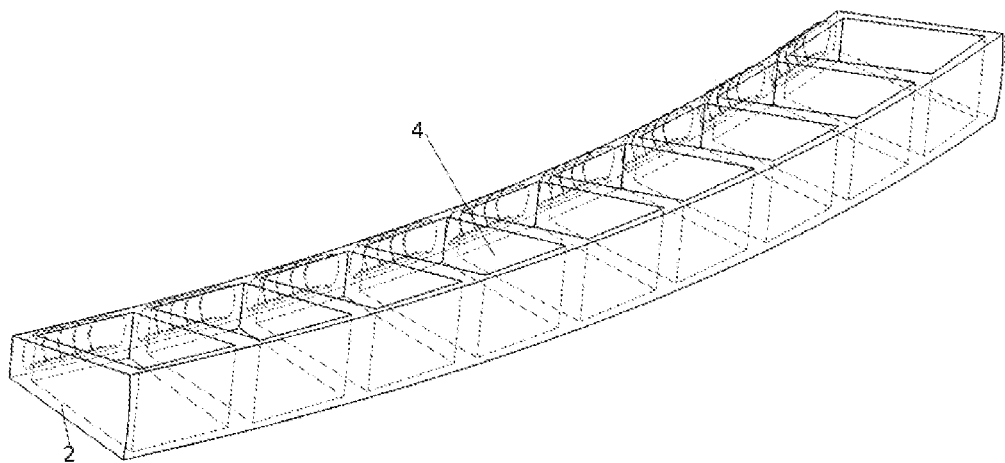
FIG. 25 is a structural schematic diagram of an optical element in an eighth implementation mode of the present disclosure.

In addition, the number of the groove structures 4 may be selected according to the design requirements. For example, as shown in FIG. 16, two side regions of the light-emitting part 3 in the length extending direction may be each provided with one groove structure 4. Similarly, the groove structure 4 may correspond to one light-incident part 1 or multiple light-incident parts 1. Or, as shown in FIG. 20, more groove structures 4 may be arranged in the length extending direction of the light-emitting part 3, and each groove structure 4 correspond to one light-incident part 1. Moreover, in the case that the arrangement orientation of the light guide body is determined, an opening direction of the groove structure 4 may be downward as shown in FIG. 20, or may be upward as shown in FIG. 25. That is, the opening direction of the groove structure 4 may be selected according to a light distribution demand and an actual installation state such as an arrangement state of other components in the lamp body after the optical element of the present disclosure is installed in a lamp body of the vehicle lamp.

In the specific implementation mode as shown in FIG. 20 and FIG. 25, one groove structure 4 is configured for each light-incident part 1, so that light interference of light between adjacent light-incident parts 1 can be prevented while flexible light distribution is realized by the two refraction surfaces added.

Figure 17:
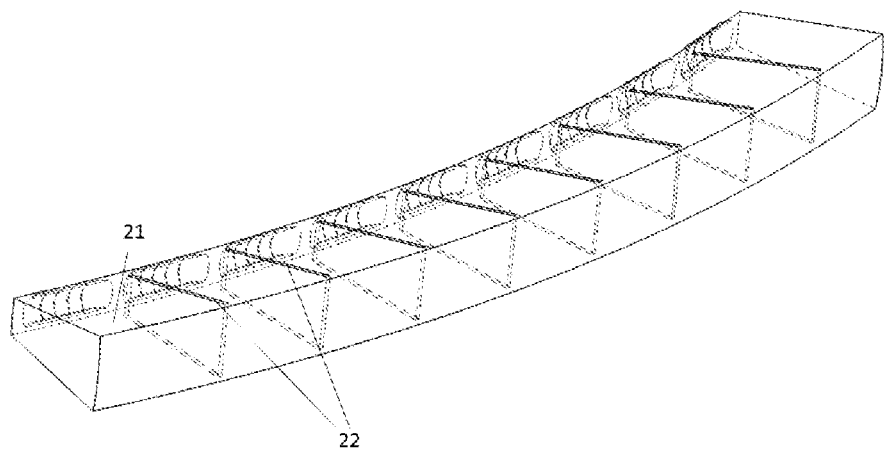
FIG. 17 is a structural schematic diagram I of an optical element in a sixth implementation mode of the present disclosure.
Figure 18:
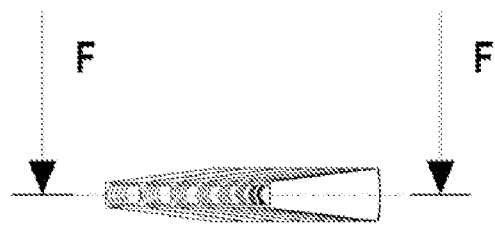
FIG. 18 is a structural schematic diagram II of the optical element in the sixth implementation mode of the present disclosure.
Figure 19:
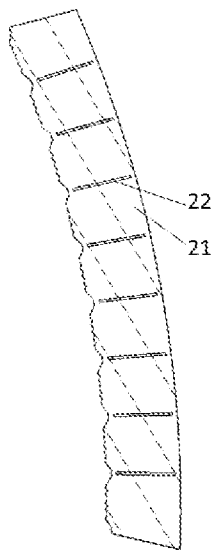
FIG. 19 is a cutaway view of FIG. 18 along the F-F line.

As another implementation mode for preventing the light interference, the specific implementation mode as shown in FIG. 17 to FIG. 19, a plurality of gaps 22 that extend in a light-emitting direction can be formed on the light guide body. That is, the light guide part 2 may be divided into a plurality of light guide structures 21, and the light guide structures 21 are in one-to-one correspondence to the light-incident parts 1. The gaps 22 are formed between adjacent side walls of adjacent light guide structures 21, through which the light interference between the light incident from two adjacent light-incident parts 1 is prevented. For example, when it is required to turn off partial light sources to form a dark region, and if there is no gap 22 between adjacent light guide structures 21, taking two adjacent light-incident parts 1 as an example, the light incident from one light-incident part 1 would be emitted to a region corresponding to its adjacent light-incident part 1. When the region corresponding to the adjacent light-incidence part 1 is a dark region, the incident light would become stray light that affects the lighting effect.

Figure 27:
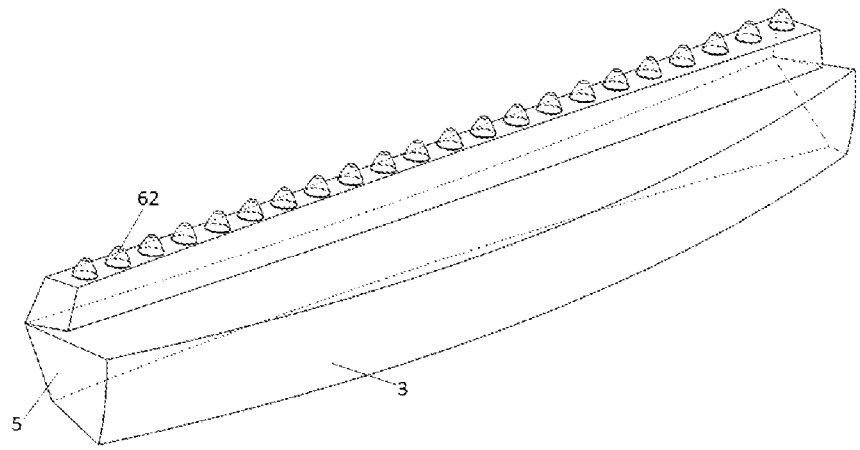
FIG. 27 is a structural schematic diagram I of an optical element in a tenth implementation mode of the present disclosure.
Figure 28:
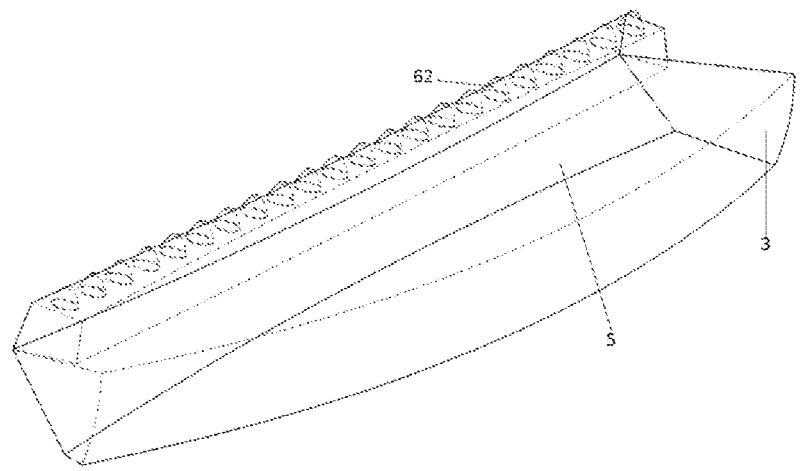
FIG. 28 is a structural schematic diagram II of the optical element in the tenth implementation mode of the present disclosure.
Figure 29:
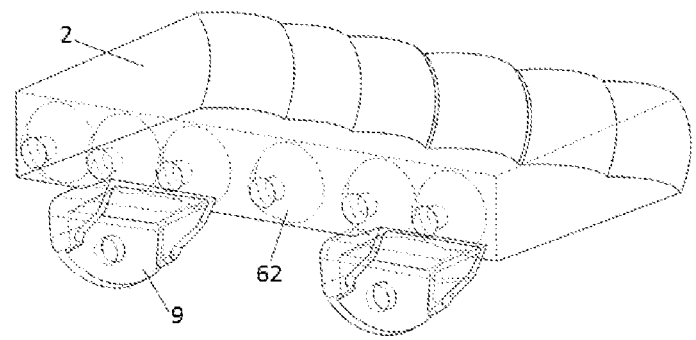
FIG. 29 is a structural schematic diagram I of an optical element in an eleventh implementation mode of the present disclosure.
Figure 30:
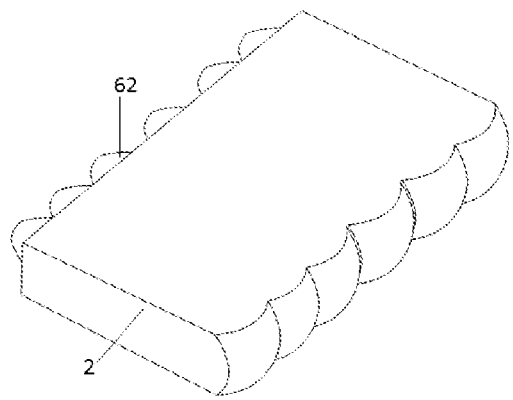
FIG. 30 is a structural schematic diagram II of the optical element in the eleventh implementation mode of the present disclosure.
Figure 31:
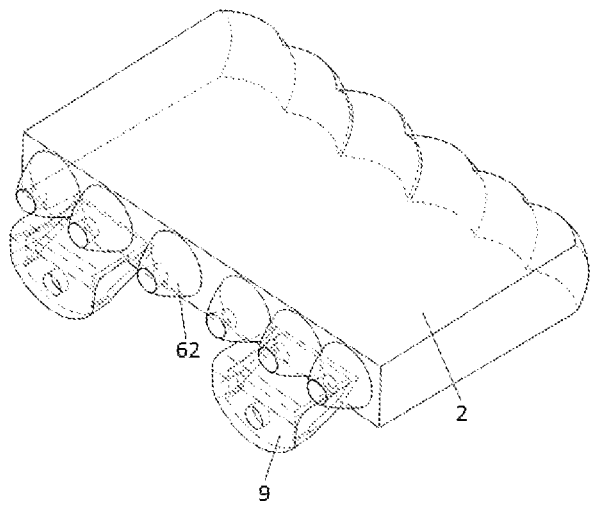
FIG. 31 is a structural schematic diagram III of the optical element in the eleventh implementation mode of the present disclosure.
Figure 32:
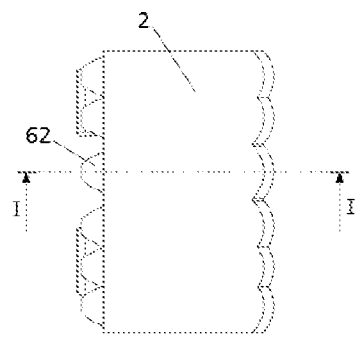
FIG. 32 is a structural schematic diagram IV of the optical element in the eleventh implementation mode of the present disclosure.

In addition, as shown in FIG. 27 and FIG. 28, the light guide body may also be bent to form a reflection surface 5 which can reflect the light received by the light-incident units, and would reflect this part of light to the light guide part 2. As such, the dimension of the optical element in the light-emitting direction can be reduced to facilitate arrangement of the optical element in the lamp body of the vehicle lamp.

Figure 13:
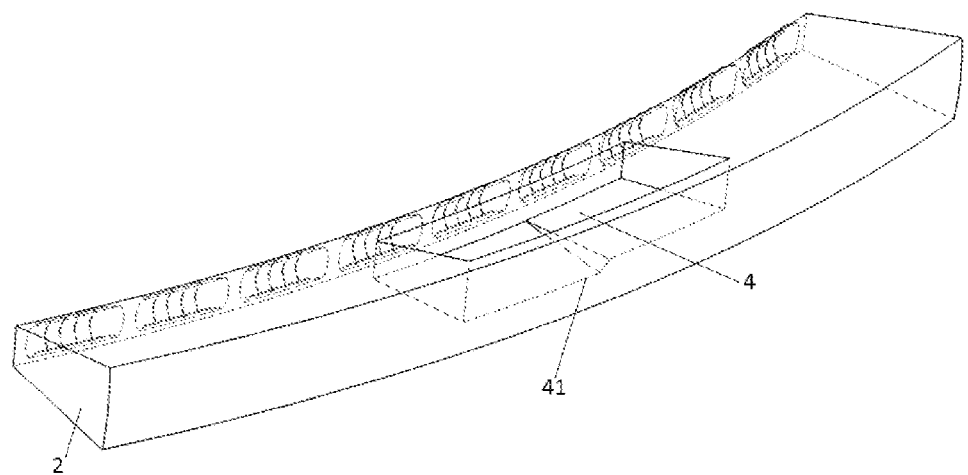
FIG. 13 is a structural schematic diagram of an optical element in a third implementation mode of the present disclosure.
Figure 14:
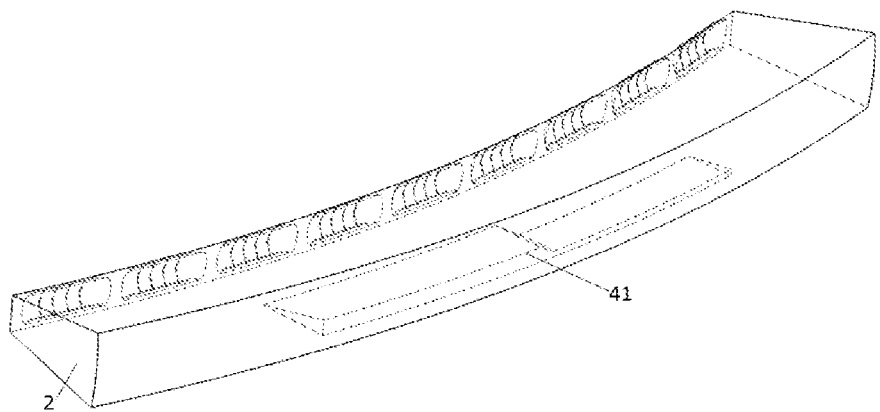
FIG. 14 is a structural schematic diagram I of an optical element in a fourth implementation mode of the present disclosure.
Figure 15:
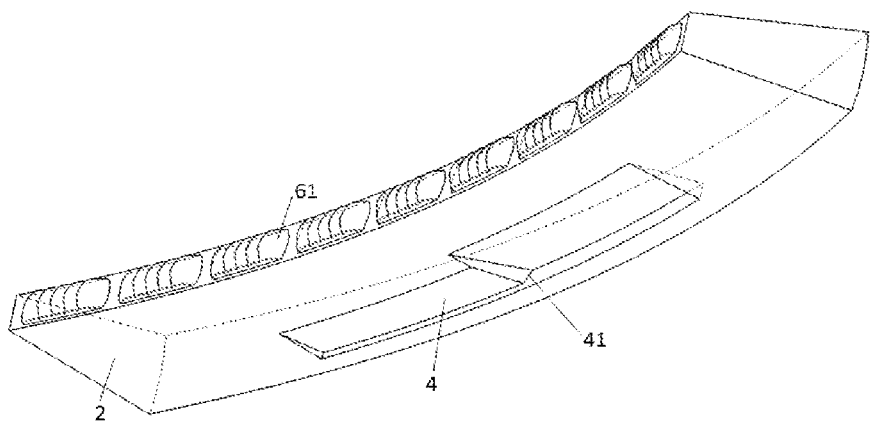
FIG. 15 is a structural schematic diagram II of the optical element in the fourth implementation mode of the present disclosure.

When the above-mentioned optical element is applied to form a low beam light shape, as a specific implementation mode, as shown in FIG. 13, a front edge of the bottom of the groove structure 4 may be provided with a cut-off part 41 used for forming a low beam cut-off line; the shape of the cut-off part 41 matches the shape of the low beam cut-off line, and the shape of the cut-off part 41 is set according to different driving ways, such as left-hand driving or right-hand driving. Adaptively, the groove structure 4 is a rectangular groove. Similarly, the opening direction of the groove structure 4 may be selected according to the actual installation state of the light guide body and the light distribution demand. FIG. 13 illustrates one specific implementation mode in which an opening of the groove structure 4 is upward, and FIG. 14 illustrates another specific implementation mode in which an opening of the groove structure 4 is downward. In the same circumstances, the difference is that the light in FIG. 14 is propagated in the light guide body all the time, and part of the light path of the light in FIG. 13 is located in the air. Both of them can meet the requirements of the low beam light shape by the light distribution design. The light received by several light-incident parts 1 corresponding to the cut-off part 41 is cut off by the cut-off part 41, and is then emitted from the light-emitting part 3 of the light guide body to form a low beam light shape having a low beam cut-off line, and the rest of the light-incident parts 1 may be used to form an auxiliary low beam light shape or high beam light shape. Different beam shapes can be realized by adjusting various light distribution parameters. The light distribution parameters include relative positions of light sources and optical surfaces of the light guide body, design parameters of the optical surfaces, and the like.

Figure 36:
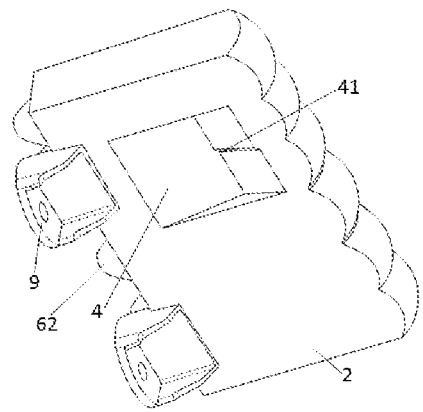
FIG. 36 is a structural schematic diagram VI of the optical element in the twelve implementation mode of the present disclosure.
Figure 37:
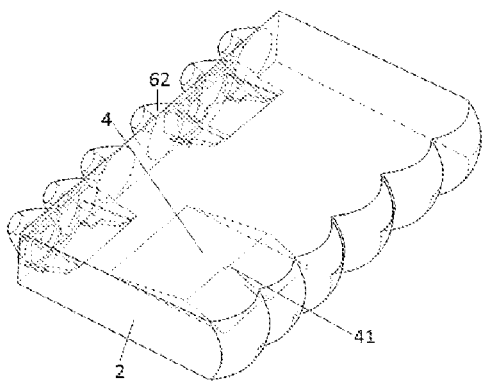
FIG. 37 is a structural schematic diagram VII of the optical element in the twelve implementation mode of the present disclosure.
Figure 38:
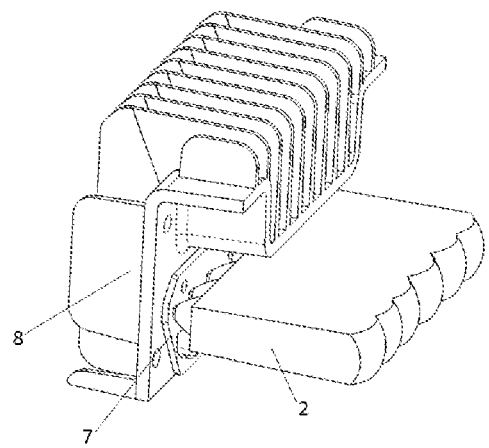
FIG. 38 is a structural schematic diagram I of an vehicle lamp module provided with an optical element in a twelve implementation mode of the present disclosure.
Figure 39:
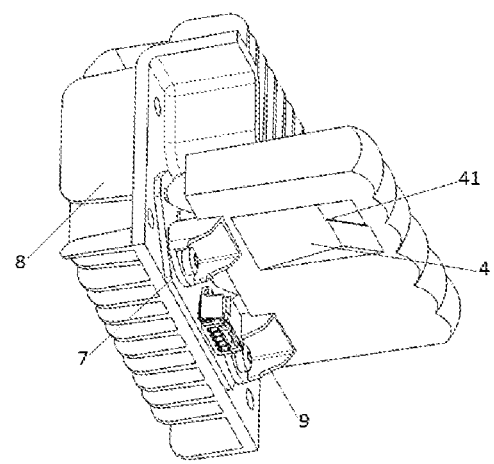
FIG. 39 is a structural schematic diagram II of the vehicle lamp module provided with the optical element in the twelve implementation mode of the present disclosure.
Figure 40:
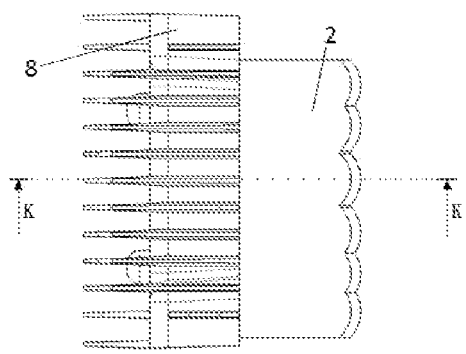
FIG. 40 is a structural schematic diagram III of the vehicle lamp module provided with the optical element in the twelve implementation mode of the present disclosure.
Figure 41:
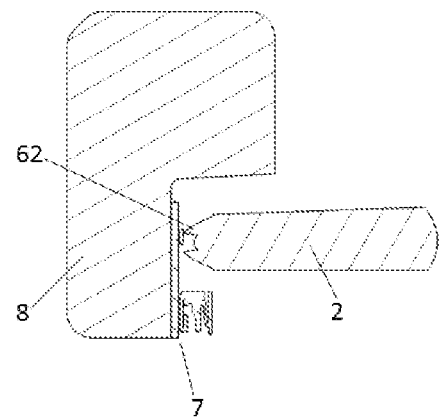
FIG. 41 is a cutaway view of FIG. 40 along the K-K line.

As another specific implementation mode for realizing the low beam light shape, as shown in FIG. 36 and FIG. 37, each light-incident part 1 of the optical element is correspondingly provided with one light-incident unit. The light-incident unit is a light concentrating structure 62 in a light concentrating cup shape. The light-emitting part 3 is formed by connecting a plurality of convex curved surfaces in sequence. The convex curved surfaces are in one-to-one correspondence to the light-incident units. The groove structure 4 located at the bottom of the light guide part 2 is of a V-shaped sharp groove structure; the top of the sharp groove structure is provided with a cut-off part 41 used for forming a low beam cut-off line. The light received by several light-incident parts 1 corresponding to the cut-off part 41 enters the light guide part 2, is cut off by the cut-off part 41, and is then emitted from the light-emitting part 3 of the light guide body to form a low beam light shape having a low beam cut-off line, and similarly, the rest of the light-incident parts 1 may be used to form an auxiliary low beam light shape or high beam light shape.

The above describes the specific implementation mode of applying the optical element of the present disclosure to forming the low beam light shape through the arrangement of the groove structure 4 and the cut-off part 41 which are in two different structural forms. Obviously, the groove structure 4 may also use other structural forms that can achieve the equivalent function and be combined with the cut-off part 41 to achieve the low beam light shape; in addition, the cut-off part 41 of the groove structure 4 may also be used to form a high beam cut-off line as needed. This is because the low beam cut-off line is to cut off the light emitted to a position below the cut-off part 41, and valid light is transmitted above the cut-off part 41; and the high beam cut-off line is to cut off the light emitted to a position above the cut-off part 41, and valid light is transmitted below the cut-off part 41. Of course, in application to the high beam light shape, the cut-off part may not be provided. The above-mentioned low beam cut-off line and high beam cut-off line are both light shape cut-off lines. According to "GB 4599-2007-Automotive Filament Bulb Headlamps", it is defined that: the light shape cut-off line is a boundary line presenting a visibly perceptible change in light and shade after a light beam is projected onto a light distribution screen. The low beam cut-off line refers to an upper boundary line of the low beam light shape, and the high beam cut-off line refers to a lower boundary line of the high beam light shape.

Figure 42:
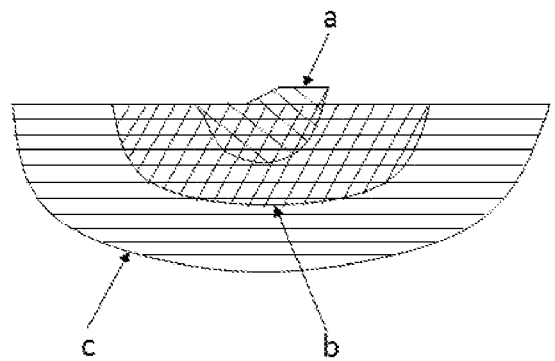
FIG. 42 is a schematic diagram of a low beam light shape formed by an optical element in one implementation mode of the present disclosure.
Figure 43:
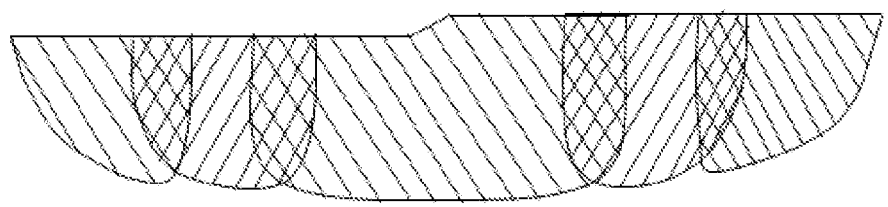
FIG. 43 is a schematic diagram of the low beam light shape formed by the optical element in another implementation mode of the present disclosure.
Figure 44:
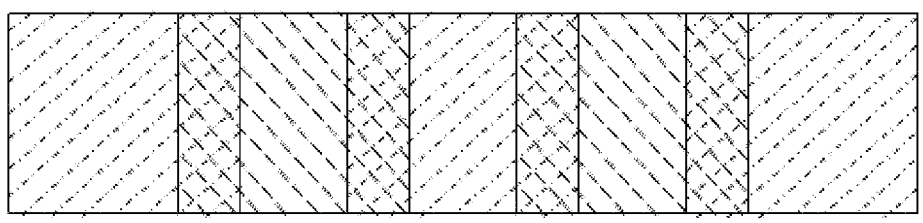
FIG. 44 is a schematic diagram of a high beam light shape formed by an optical element in one implementation mode of the present disclosure.

It should be noted that a plurality of light-incident parts 1 are used to form a plurality of different lighting regions, and the plurality of different lighting regions are superimposed to form a complete vehicle lamp light shape. The plurality of light-incident parts 1 may be arranged at intervals or connected as a whole. For example, as shown in FIG. 42, during installation of the optical element of the present disclosure, by setting the relative positions of light sources and the optical surfaces of the light guide body corresponding thereto and the design parameters of the optical surfaces, a main low beam lighting region a having a low beam cut-off line may be formed through the groove structure 4, and a first auxiliary low beam lighting region b and a second auxiliary low beam lighting region c may also be formed, so that the main low beam lighting region a is located inside the first auxiliary low beam lighting region b, and the first auxiliary low beam lighting region b forms a larger lighting region on the left and right and lower side of the main low beam lighting region a; and the first auxiliary low beam lighting region b is located inside the second auxiliary low beam lighting region c, and the second auxiliary low beam lighting region c forms a larger lighting region at the left and right and lower side of the first auxiliary low beam lighting region b; the three regions are superimposed up and down to form a complete low beam light shape. In addition, the light sources corresponding to the first auxiliary low beam lighting region b and the second auxiliary low beam lighting region c may be separately addressable light sources, and the size of a lighting range of a low beam is controlled by the on and off of the light sources. The separate addressability means that the on and off of the light sources can be separately controlled. For another example, FIG. 43 illustrates an example for forming a low beam light shape by taking five light-incident parts 1 as an example. The five light-incident parts 1 correspond to five lighting regions. The lighting region in the middle is a low beam lighting region having a low beam cut-off line, and the other four lighting regions are located on the left and right sides of the middle lighting region respectively to form a low beam light shape with a relatively large broadening range. Similarly, the light sources corresponding to the five light-incident parts 1 may also be separately addressable light sources to control the lighting range of the low beam. For another example, FIG. 44 illustrates an example for forming a high beam light shape by taking five light-incident parts 1 as an example. The five light-incident parts 1 correspond to five lighting regions that are superimposed in the left-right direction to realize an ADB (adaptive driving beam) function of an vehicle lamp. That is, when there are pedestrians or vehicles in the opposite lane, the light sources of the corresponding regions are turned off to avoid causing dazzling of the pedestrians or vehicles in the opposite lane.

Referring to FIG. 1 to FIG. 37, the optical element of the preferred implementation mode of the present disclosure includes a light guide body. The light guide body is an integrated transparent piece, and includes a plurality of light-incident parts 1, a light guide part 2 and a light-emitting part 3. The light-incident parts 1 are arranged in a length extending direction of the light-emitting part 3 in sequence. The light-emitting part 3 is a smooth curved surface protruding towards a light-emitting side or is formed by connecting a plurality of convex curved surfaces in sequence, and the shape of the forward projection surface of the light-emitting part 3 is of a strip type. At least one light-incident unit is arranged on each light-incident part 1, and light received by the light-incident units can be emitted to the light-emitting part 3 through the light guide part 2. At least one groove structure 4 is formed on the light guide part 2, thus making the light distribution more flexible. A cut-off part 41 may be formed at a front edge of the bottom of one of the groove structures 4 that is shaped like a rectangular groove or the top of a V-shaped groove structure 4, and the cut-off part 41 can be used for forming a low beam cut-off line. The light received by several light-incident parts 1 corresponding to the cut-off part 41 is cut off by the cut-off part 41, and is then emitted from the light-emitting part 3 of the light guide body to form a low beam light shape having a low beam cut-off line, and the rest of the light-incident parts 1 may be used to form an auxiliary low beam light shape or high beam light shape to realize different lighting modes of an vehicle lamp. The light guide body may also be bent to form a reflection surface 5 which can reflect the light received by the light-incident units, and would reflect this part of light to the light guide part 2, so that the dimension of the optical element in the light-emitting direction can be reduced to facilitate arrangement of the optical element in the vehicle lamp. Each light-incident unit may be a protrusion 61 protruding towards a light-incident side, and the plurality of protrusions 61 corresponding to the light-incident parts 1 are connected to each other in sequence. Each light-incident unit may also be a light concentrating structure 62 in a light concentrating cup shape. A concave cavity is formed in the rear end of the light concentrating structure 62 to improve the light efficiency. The light guide body is the integrated transparent piece, which may be made of a transparent material such as glass, PC, PMMA, or silica gel.

It can be seen from the above that the light guide body is set to be of the integrated structure, and the shape of the front projection surface of the light-emitting part 3 is in the narrow-long shape, so that the structure is simplified, the modeling is attractive, the optical system accuracy is high, the lighting effect is good, and the occupied space is relatively small.

As shown in FIG. 38 to FIG. 41, an vehicle lamp module of the present disclosure includes the optical element according to any one of the technical solutions of the first aspect and a plurality of separately addressable light sources corresponding to the light-incident units. The optical parts of the vehicle lamp module only include the light sources and one integrated light guide body, and no other optical parts are involved, so that the vehicle lamp module also has higher optical system accuracy, good lighting effect, smaller occupied space and higher space utilization rate, and is convenient for layout design in the vehicle lamp.

Generally, the light sources are arranged on a circuit board 7, and the circuit board 7 is connected to a heat dissipater 8. The light guide body may be provided with a connecting structure 9, so that the light guide body is connected to the circuit board 7 through the connecting structure 9 to determine relative positions between the light-incident units and the corresponding light sources.

An vehicle lamp of the present disclosure may be provided with the vehicle lamp module described in any of the above embodiments, that is, the vehicle lamp adopts all the technical solutions of all the vehicle lamp module embodiments described above, and therefore at least has all the beneficial effects brought by the technical solutions of the above vehicle lamp module embodiments.

In addition, the optical element of the present disclosure is not limited to being applied to functional modes such as low beam and high beam, but may also be applied to other functional modes of an vehicle lamp, such as ADB (adaptive driving beam), Matrix (matrix mode), corner lamp, Bending (turning mode), AWL (all-weather light) and other functional modes.

An vehicle of the present disclosure may be provided with the vehicle lamp described in any of the above-mentioned embodiments, that is, the vehicle adopts all the technical solutions of all the above-mentioned vehicle lamp embodiments, and therefore at least has all the beneficial effects brought by the technical solutions of the above-mentioned vehicle lamp embodiments.

The preferred implementation modes of the present disclosure have been described in detail above with reference to the accompanying drawings, but the present disclosure is not limited thereto. Within the scope of the technical idea of the present disclosure, a variety of simple modifications can be made to the technical solutions of the present disclosure, including combinations of individual specific technical features in any suitable manners. In order to avoid unnecessary repetitions, various possible combinations are not described separately in the present disclosure. However, these simple modifications and combinations shall also be regarded as the content disclosed by the present disclosure, and all belong to the protection scope of the present disclosure.

The invention claimed is:

1. An optical element, comprising a light guide body, wherein the light guide body comprises a plurality of light-incident parts arranged along a length extension direction of the light guide body, a light guide part and a light-emitting part; each light-incident part is provided with at least one light-incident unit; the light guide part is configured to guide light received by the light-incident units to be emitted towards the light-emitting part; the shape of a forward projection surface of the light-emitting part is of a strip shape; at least one groove structure is formed on the light guide part; and a cut-off part used for forming a light shape cut-off line is formed on one of the groove structures; the light received by several light-incident parts corresponding to the cut-off part is cut off by the cut-off part, and is then emitted from the light-emitting part of the light guide body to form a low beam light shape with a low beam cut-off line, and the rest of the light-incident parts are used to form a high beam light shape;

a plurality of light-incident units are connected in sequence and disposed on the corresponding light-incident part, and the light-incident unit is a protrusion protruding towards a light-incident side.

2. The optical element according to claim 1, wherein one groove structure is formed in a middle region or one of two side regions of the light guide part.

3. The optical element according to claim 1, wherein the groove structures are respectively formed in the two side regions of the light guide part.

4. The optical element according to claim 1, wherein a plurality of groove structures which are in one-to-one correspondence to the light-incident parts are formed on the light guide part.

5. The optical element according to claim 1, wherein a width of the forward projection surface of the light-emitting part is not less than 5 mm and not greater than 30 mm.

6. The optical element according to claim 1, wherein the light guide body further comprises a reflection surface, and the reflection surface is configured to reflect the light received by the light-incident units to the light guide part.

7. The optical element according to claim 1, wherein the light-emitting part is a smooth curved surface, and an arrangement direction of the light-incident parts is consistent with a length extending direction of the light-emitting part.

8. The optical element according to claim 1, wherein the light-emitting part is formed by connecting a plurality of convex curved surfaces in sequence.

9. An vehicle lamp module, comprising the optical element according to claim 1, and a plurality of separately addressable light sources corresponding to the light-incident units.

10. The vehicle lamp module according to claim 9, further comprising a circuit board and a heat dissipater, wherein the light sources are located on the circuit board connected to the heat dissipater; and a connecting structure connected to the circuit board is arranged on the light guide body.

11. The vehicle lamp module according to claim 9, wherein one groove structure is formed in a middle region or one of two side regions of the light guide part.

12. The vehicle lamp module according to claim 9, wherein the groove structures are respectively formed in the two side regions of the light guide part.

13. The vehicle lamp module according to claim 9, wherein a plurality of groove structures which are in one-to-one correspondence to the light-incident parts are formed on the light guide part.

14. The vehicle lamp module according to claim 9, wherein a width of the forward projection surface of the light-emitting part is not less than 5 mm and not greater than 30 mm.

15. The vehicle lamp module according to claim 9, wherein the light guide body further comprises a reflection surface, and the reflection surface is configured to reflect the light received by the light-incident units to the light guide part.

16. The vehicle lamp module according to claim 9, wherein the light-emitting part is a smooth curved surface, and an arrangement direction of the light-incident parts is consistent with a length extending direction of the light-emitting part.

17. The vehicle lamp module according to claim 9, wherein the light-emitting part is formed by connecting a plurality of convex curved surfaces in sequence.

* * * * *